(12) United States Patent
Watanabe et al.

(10) Patent No.: US 9,037,663 B2
(45) Date of Patent: May 19, 2015

(54) DATABASE MANAGEMENT DEVICE, DATABASE MANAGEMENT METHOD, DATABASE MANAGEMENT PROGRAM AND COMPUTER READABLE STORAGE MEDIUM THAT STORES SAID PROGRAM

(75) Inventors: Masahiro Watanabe, Shinagawa-ku (JP); Manabu Oshiro, Shinagawa-ku (JP); Noriko Harada, Shinagawa-ku (JP); Hidekazu Hamada, Shinagawa-ku (JP); Reiko Yasuda, Shinagawa-ku (JP); Teppei Hida, Shinagawa-ku (JP); Yuko Furusho, Shinagawa-ku (JP); Koichi Yanagimoto, Shinagawa-ku (JP); Ai Shimogori, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/636,460

(22) PCT Filed: May 31, 2011

(86) PCT No.: PCT/JP2011/062524
§ 371 (c)(1),
(2), (4) Date: Sep. 21, 2012

(87) PCT Pub. No.: WO2011/152417
PCT Pub. Date: Dec. 8, 2011

(65) Prior Publication Data
US 2013/0132491 A1 May 23, 2013

(30) Foreign Application Priority Data
May 31, 2010 (JP) .................................. 2010-123683

(51) Int. Cl.
*G06F 15/16* (2006.01)
*H04L 12/58* (2006.01)
(Continued)

(52) U.S. Cl.
CPC .............. *H04L 51/00* (2013.01); *G06Q 10/107* (2013.01); *G06Q 50/01* (2013.01)

(58) Field of Classification Search
USPC .......................................................... 709/206
See application file for complete search history.

(56) References Cited

U.S. PATENT DOCUMENTS 7,720,723 B2 * 5/2010 Dicker et al. ................. 705/26.8
8,090,621 B1 * 1/2012 Chakrabarti et al. ........ 705/26.1
(Continued)

FOREIGN PATENT DOCUMENTS

JP 2001-306927 A 11/2001
JP 2002-015219 A 1/2002
(Continued)

OTHER PUBLICATIONS

International Search Report of PCT/JP2011/062524 dated Aug. 30, 2011.
(Continued)

*Primary Examiner* — Phuoc Nguyen
(74) *Attorney, Agent, or Firm* — Sughrue Mion, PLLC

(57) ABSTRACT

A server (11) includes a history registration unit (73) that acquires information of a recommendation email for recommending a specified recommended object from a first user to a second user, generates recommendation data in which the first user, the second user and a web page of the recommended object are associated based on the information, and registers the recommendation data into a history database (63), an operation information acquisition unit (76) that acquires operation information indicating operation performed by the second user on the web page of the recommended object in response to the recommendation email, and a history update unit (77) that specifies an action of the second user taken on the recommended object based on the operation information and adds action information indicating the specified action to the corresponding recommendation data.

10 Claims, 14 Drawing Sheets

(51) Int. Cl.
*G06Q 10/10* (2012.01)
*G06Q 50/00* (2012.01)

(56) References Cited

U.S. PATENT DOCUMENTS

| | | | |
|---|---|---|---|
| 8,260,656 B1* | 9/2012 | Harbick et al. | 705/7.31 |
| 8,275,674 B2* | 9/2012 | Kane et al. | 705/27.1 |
| 2002/0107758 A1 | 8/2002 | Takakura et al. | |
| 2007/0252004 A1 | 11/2007 | Shiraki et al. | |
| 2008/0235078 A1* | 9/2008 | Hong et al. | 705/10 |
| 2008/0255933 A1 | 10/2008 | Leventhal et al. | |
| 2008/0255934 A1 | 10/2008 | Leventhal et al. | |
| 2009/0106081 A1 | 4/2009 | Burgess et al. | |
| 2010/0115037 A1* | 5/2010 | Hull et al. | 709/206 |
| 2012/0296764 A1* | 11/2012 | Poon et al. | 705/26.3 |
| 2013/0103494 A1* | 4/2013 | Leventhal | 705/14.49 |

FOREIGN PATENT DOCUMENTS

| | | |
|---|---|---|
| JP | 2002-230411 A | 8/2002 |
| JP | 2003-016336 A | 1/2003 |
| JP | 2004-265013 A | 9/2004 |
| JP | 2007-115220 A | 5/2007 |
| JP | 2007-317177 A | 12/2007 |
| JP | 2008-234436 A | 10/2008 |
| JP | 2009-237894 A | 10/2009 |
| JP | 2010-165097 A | 7/2010 |

OTHER PUBLICATIONS

International Search Report of Counterpart PCT/JP2011/062532 dated Aug. 23, 2011.

English Translation of International Preliminary Report on Patentability dated Jan. 17, 2013, issued in PCT Application No. PCT/JP2011/062524.

English Translation of International Preliminary Report on Patentability dated Jan. 17, 2013, issued in PCT Application No. PCT/JP2011/062532.

United States Office Action dated Feb. 20, 2014 issued in corresponding U.S. Appl. No. 13/581,414.

* cited by examiner

Fig.6

| LOGIN PAGE | |
|---|---|
| FOR REGISTERED USERS | |
| ENTER USER ID AND PASSWORD, THEN PRESS "NEXT" | |
| USER ID | [         ] <HALF-WIDTH CHARACTERS> |
| PASSWORD | [         ] <HALF-WIDTH CHARACTERS> |
| | NEXT |

Fig.7

RECOMMEND TO FRIENDS

DESTINATION

| EMAIL ADDRESS | NICKNAME |
|---|---|
| user_k@aaa.ne.jp | USER K |
| user_j@bbb.ne.jp | USER J |
| user_m@ccc.ne.jp | USER M |
| | |

YOUR EMAIL ADDRESS　aaa@xxx.com
YOUR NAME　　　　　　USER R
COMMENTS OF RECOMMENDATION (TEXT OF EMAIL)

This is a good item!

FOLLOWING INFORMATION IS SHOWN AT THE BOTTOM OF EMAIL

■PRODUCT NAME　HARD WOODEN BAT
　　　http://bbb.co.jp/ccc

■SHOP NAME　SHOP Y
　　　http:/ddd.co.jp/eee

SEND

Fig. 8

| RECOMMENDER ID | GROUP ID | DATE AND TIME SENT | SEND ID | EMAIL ADDRESS | URL (TRACKING IDENTIFIER) | ACTION INFORMATION |
|---|---|---|---|---|---|---|
| 001 | G001 | 2011.5.6 10:30:00 | T001 | user_k@aaa.ne.jp | http://abc.aaa.ne.jp(001) | ... |
| | | | T002 | user_j@bbb.ne.jp | http://abc.bbb.ne.jp(002) | ... |
| | | | T003 | user_m@ccc.ne.jp | http://abc.ccc.ne.jp(003) | ... |
| | G002 | 2011.5.9 21:30:00 | T004 | user_x@ccc.ne.jp | http://def.ccc.ne.jp(004) | ... |
| | | | T005 | user_j@bbb.ne.jp | http://def.bbb.ne.jp(005) | ... |
| | | ⋮ | ⋮ | ⋮ | ⋮ | ⋮ |
| 002 | ⋮ | ⋮ | ⋮ | ⋮ | ⋮ | ⋮ |

ACTION INFORMATION

| ACCESS | LOGIN | PURCHASE | PURCHASE EMAIL | FAVORITE | RESPONSE EMAIL |
|---|---|---|---|---|---|
| NO | NO | NO | NO | NO | — |
| NO | NO | NO | NO | NO | — |
| NO | NO | NO | NO | NO | — |
| NO | NO | NO | NO | NO | — |
| ⋮ | ⋮ | ⋮ | ⋮ | ⋮ | ⋮ |

Fig.9

| EMAIL ADDRESS | SEND ID | GROUP ID | DATE AND TIME SENT | URL(TRACKING IDENTIFIER) | ACTION INFORMATION |
|---|---|---|---|---|---|
| user_k@aaa.ne.jp | T001 | G001 | 2011.5.6 10:30:00 | http://abc.aaa.ne.jp(001) | ... |
| | T002 | G004 | 2011.5.10 22:30:00 | http://xyz.aaa.ne.jp(102) | ... |
| | T153 | G005 | 2011.5.15 09:00:00 | http://pqr.aaa.ne.jp(103) | ... |
| user_j@bbb.ne.jp | T002 | G001 | 2011.5.6 10:30:00 | http://abc.bbb.ne.jp(002) | ... |
| | T005 | G002 | 2011.5.9 21:30:00 | http://def.bbb.ne.jp(005) | ... |
| ... | ... | ... | ... | ... | ... |

ACTION INFORMATION

| ACCESS | LOGIN | PURCHASE | PURCHASE EMAIL | FAVORITE | RESPONSE EMAIL |
|---|---|---|---|---|---|
| NO | NO | NO | NO | NO | — |
| NO | NO | NO | NO | NO | — |
| NO | NO | NO | NO | NO | — |
| NO | NO | NO | NO | NO | — |
| ... | ... | ... | ... | ... | ... |

Fig.10

| RECOMMENDER ID | GROUP ID | DATE AND TIME SENT | SEND ID | EMAIL ADDRESS | URL (TRACKING IDENTIFIER) | ACTION INFORMATION |
|---|---|---|---|---|---|---|
| 001 | G001 | 2011.5.6 10:30:00 | T001 | user_k@aaa.ne.jp | http://abc.aaa.ne.jp(001) | ... |
| | | | T002 | user_j@bbb.ne.jp | http://abc.bbb.ne.jp(002) | ... |
| | | | T003 | user_m@ccc.ne.jp | http://abc.ccc.ne.jp(003) | ... |
| | G002 | 2011.5.9 21:30:00 | T004 | user_x@ccc.ne.jp | http://def.ccc.ne.jp(004) | ... |
| | | | T005 | user_j@bbb.ne.jp | http://def.bbb.ne.jp(005) | ... |
| 002 | ... | ... | ... | ... | ... | ... |
| ... | | | | | | |

ACTION INFORMATION

| ACCESS | LOGIN | PURCHASE | PURCHASE EMAIL | FAVORITE | RESPONSE EMAIL |
|---|---|---|---|---|---|
| YES(2011.5.12 22:40:00) | NO | YES(2011.5.12 22:50:00) | NO | NO | PURCHASE EMAIL |
| YES(2011.5.10 19:20:00) | YES(2011.5.10 19:20:20) | YES(2011.5.10 19:23:00) | YES(2011.5.12 22:50:00) | NO | RECOMMENDATION EMAIL |
| NO | NO | NO | NO | NO | — |
| YES(2011.5.9 22:40:00) | NO | NO | NO | YES(2011.5.9 22:41:00) | RECOMMENDATION EMAIL |
| NO | NO | NO | NO | NO | — |
| ... | ... | ... | ... | ... | ... |

DATABASE MANAGEMENT DEVICE, DATABASE MANAGEMENT METHOD, DATABASE MANAGEMENT PROGRAM AND COMPUTER READABLE STORAGE MEDIUM THAT STORES SAID PROGRAM

CROSS REFERENCE TO RELATED APPLICATIONS

This application is a National Stage of International Application No. PCT/JP2011/062524 filed May 31, 2011, claiming priority based on Japanese application No. 20010-123683 filed May 31, 2010, the contents of all which are incorporated herein by reference in their entirety.

TECHNICAL FIELD

The present invention relates to a database management device, a database management method, a database management program and a computer readable storage medium that stores said program.

BACKGROUND ART

Systems for recommending various recommended objects to others through Web sites are known. For example, Patent Literature 1 discloses a sales promotion system for facilitating sales promotion of products by introduction. In this sales promotion system, an introducer who has purchased products using a mobile terminal selects a product desired to be recommended to others from the products for which the payment is done, and a recommendation advertising ID of the selected product is provided to a person to whom introduction is made. Further, Patent Literature 2 discloses a membership management system that introduces others to become a member using a mobile terminal. In this membership management system, when a first mobile terminal notifies the email address of a second mobile terminal to a server, the server notifies the URL of an application to be downloaded when becoming a member to the second terminal by email.

CITATION LIST

Patent Literature

PTL 1: JP 2008-234436 A
PTL 2: JP 2009-237894 A

SUMMARY OF INVENTION

Technical Problem

In the system as disclosed in Patent Literatures 1 and 2, the process ends at the point when recommendation is made. However, in the technique disclosed in Patent Literature 1, it is difficult to keep track of users' actions after receiving recommendation and it is thus difficult to perform various kinds of processing (for example, measurements of recommendation effects) on the basis of recommendation results. It is therefore demanded to keep track of users' actions after receiving recommendation.

Solution to Problem

A database management device according to one aspect of the invention includes an email acquisition unit that acquires information of a recommendation email for recommending a specified recommended object from a first user to a second user, the recommendation email containing information about a web page of the recommended object, a registration unit that generates recommendation data in which the first user, the second user and the web page of the recommended object are associated based on the information acquired by the email acquisition unit, and registers the recommendation data into a database, an operation information acquisition unit that acquires operation information indicating operation performed by the second user on the web page of the recommended object in response to the recommendation email, and an update unit that specifies an action of the second user taken on the recommended object based on the operation information and adds action information indicating the specified action to the corresponding recommendation data.

A database management method according to one aspect of the invention is a database management method executed by a database management device, the method including an email acquisition step of acquiring information of a recommendation email for recommending a specified recommended object from a first user to a second user, the recommendation email containing information about a web page of the recommended object, a registration step of generating recommendation data in which the first user, the second user and the web page of the recommended object are associated based on the information acquired in the email acquisition step, and registering the recommendation data into a database, an operation information acquisition step of acquiring operation information indicating operation performed by the second user on the web page of the recommended object in response to the recommendation email, and an update step of specifying an action of the second user taken on the recommended object based on the operation information and adding action information indicating the specified action to the corresponding recommendation data.

A database management program according to one aspect of the invention causes a computer to implement an email acquisition unit that acquires information of a recommendation email for recommending a specified recommended object from a first user to a second user, the recommendation email containing information about a web page of the recommended object, a registration unit that generates recommendation data in which the first user, the second user and the web page of the recommended object are associated based on the information acquired by the email acquisition unit, and registers the recommendation data into a database, an operation information acquisition unit that acquires operation information indicating operation performed by the second user on the web page of the recommended object in response to the recommendation email, and an update unit that specifies an action of the second user taken on the recommended object based on the operation information and adds action information indicating the specified action to the corresponding recommendation data.

A computer-readable recording medium according to one aspect of the invention stores a database management program causing a computer to implement an email acquisition unit that acquires information of a recommendation email for recommending a specified recommended object from a first user to a second user, the recommendation email containing information about a web page of the recommended object, a registration unit that generates recommendation data in which the first user, the second user and the web page of the recommended object are associated based on the information acquired by the email acquisition unit, and registers the recommendation data into a database, an operation information acquisition unit that acquires operation information indicating operation performed by the second user on the web page of the recommended object in response to the recommendation email, and an update unit that specifies an action of the second user taken on the recommended object based on the operation information and adds action information indicating the specified action to the corresponding recommendation data.

According to the above aspects, the recommendation data is generated based on the recommendation email sent from the first user to recommend a product to the second user to receive the recommendation and registered into the database. Then, when the second user operates the web page of the product in response to the recommendation email, the action information indicating the action specified based on the operation is added to the recommendation data. Specifically, the first user who has recommended a product, the second user who has received the recommendation, the product, and the action of the second user taken on the product are associated with one another. The action taken by the second user because of the recommendation email is thereby obtained as the recommendation data, and it is thus possible to keep track of the user's action after receiving the recommendation.

In the database management device according to another aspect, the second user may be identified by an email address of the second user in the recommendation data. In this case, because the destination of the recommendation email can be used as it is as the identifier of the second user, the recommendation data can be generated for any users. Further, the identifier of the second user can be obtained easily.

In the database management device according to yet another aspect, the recommendation data may further contain date and time the recommendation email has been sent, and the action information may further indicate date and time the second user has taken the action. In this manner, by recording the date and time the recommendation email has sent and the date and time the user's action has taken as a part of the recommendation data, it is possible to use the recommendation data for the measurement of various effects related to time.

In the database management device according to yet another aspect, the action of the second user specified by the update unit may include at least one of access to the web page of the recommended object, login to the web page of the recommended object, application for the recommended object, and addition of the web page of the recommended object to favorites.

In the database management device according to yet another aspect, a plurality of second users may be designated as a destination of the recommendation email, an action of one user of the plurality of second users specified by the update unit may include sending of an application email indicating that application is made for the recommended object, and the application email may be sent to other users of the plurality of second users.

In the database management device according to yet another aspect, a web page for selecting whether to send the application email may be provided to a terminal of one user of the plurality of second users having applied for the recommended object, and the application email may be sent to other users of the plurality of second users only when said one user has selected to send the application email. In this manner, by giving the second user (applicant) who has applied for the recommended object an option regarding sending of the application email, the applicant can keep others unaware of the fact of purchase. In this way, the privacy of the applicant can be respected.

In the database management device according to yet another aspect, the recommendation data updated by the update unit may be used for at least one of measurement of effects of the recommendation email, presentation of destinations of the recommendation email to the first user, and presentation of a recommended product to the second user.

Advantageous Effects of Invention

According to one aspect of the present invention, it is possible to keep track of users' actions after receiving recommendation.

BRIEF DESCRIPTION OF DRAWINGS

FIG. 6 is a diagram showing an example of an authentication page.

FIG. 7 is a diagram showing an example of a recommendation email send page.

FIG. 8 is a diagram showing an example of initial data of a recommendation history.

FIG. 9 is a diagram showing another example of initial data of a recommendation history.

FIG. 10 is a diagram showing an example of the recommendation history shown in FIG. 8.

DESCRIPTION OF EMBODIMENTS

Embodiments of the present invention will be described hereinafter in detail with reference to the appended drawings. It is noted that in the description of the drawings, the same or equivalent elements will be denoted by the same reference symbols and redundant description will be omitted.

Figure 1:
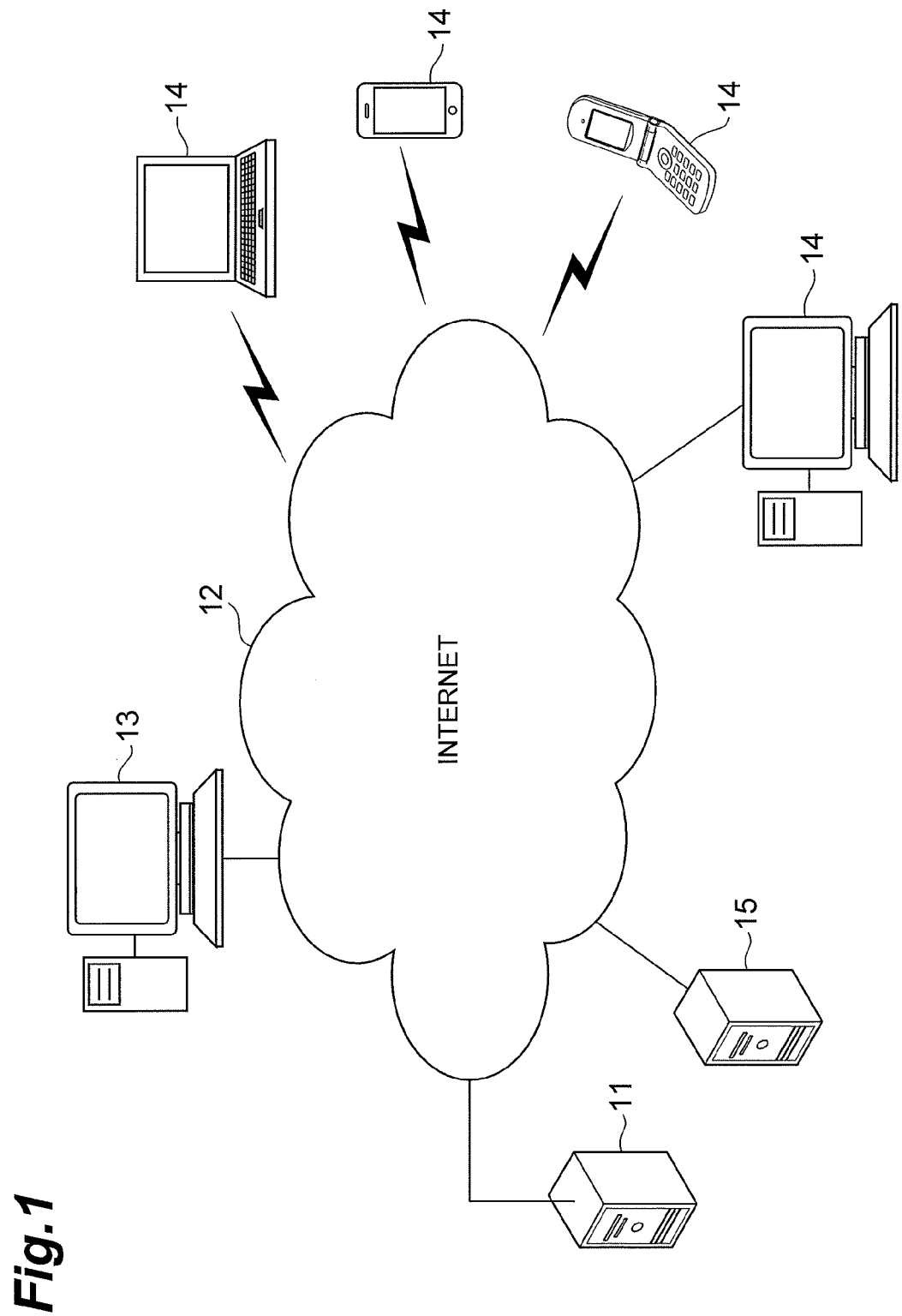
FIG. 1 is a diagram showing an overall configuration of an information providing system according to an embodiment.

FIG. 1 is a diagram showing a configuration of an information providing system 1 according to an embodiment. The information providing system 1 includes a server 11, Internet 12, a client 13, clients 14, and a redirect server 15. The server 11 is connected with the clients 13 and 14 and the redirect server 15 through the Internet and can thereby communicate in two way with the clients 13 and 14 and the redirect server 15. In this embodiment, a database management device according to the invention is applied to the server 11.

The server 11 is an information providing apparatus that provides a Web page for selling products to the client 13 or the clients 14 and receives an application for purchase of a product from the client 13 or the clients 14. In other words, the server 11 provides an online shopping site to users. Note that the product may be a tangible item or an intangible item such as a service. The server 11 may be a dedicated server, a personal computer, a virtual server, or a system combining those.

The Internet 12 is an example of a communication network. The Internet 12 is a wired or wireless public network or private network, LAN (Local Area Network), WAN (Wide Area Network) or the like.

The clients 13 and 14 are terminals with browser and email functions. The clients 13 and 14 acquire a Web page from the server 11 according to user operation and display the page on the browser. Further, the clients 13 and 14 receive emails sent from the server 11. Examples of the clients 13 and 14 include a personal computer, a cellular phone and the like, though the types of the clients 13 and 14 are not limited thereto.

The redirect server 15 is a computer that receives HTTP (Hypertext Transfer Protocol) requests containing a redirect URL, which is described later, transmitted from the client 13 or 14 and transfers the requests to a redirect destination server (the server 11 in this embodiment).

The server 11 is described specifically. The server 11 sends an email for recommending a product (recommendation email) to one or more users of the clients 14 in response to an instruction from the client 13. Hereinafter, a user (first user) of the client 13 who makes recommendation for a product is referred to as a recommender, and users (second users) of the clients 14 who receive recommendation for a product is referred to as the other users. Note that, in Japanese patent application No. 2010-123683 filed on May 31, 2010, upon which the application is based and from which the benefit of priority is claimed, the other user is referred as "person to whom recommendation is made". When the other user who has received the recommendation email purchases a product that is recommended (which is hereinafter referred to also as "recommended product") and becomes a purchaser of the product, the server 11 sends an email indicating purchase of a product (purchase email) to the other users excluding the purchaser. The purchaser is one type of an applicant, and the purchase email is one type of an application email.

Figure 2:
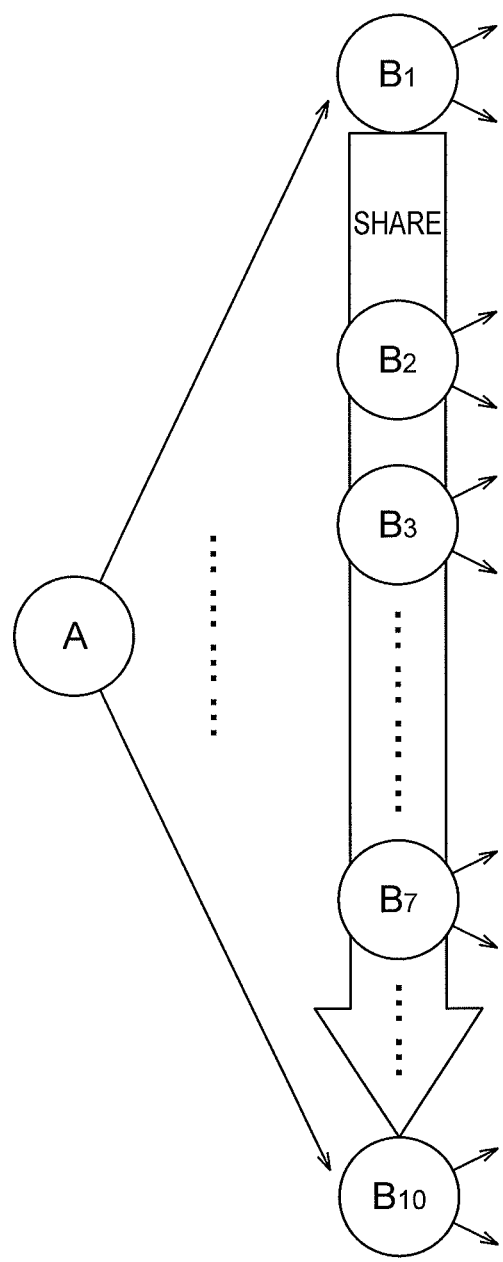
FIG. 2 is a diagram showing a concept of recommendation of a product in an embodiment.

FIG. 2 is a diagram showing recommendation of a product in the information providing system 1. In FIG. 2, A indicates a recommender, and $B_1$ to $B_{10}$ indicate the other users. In the information providing system 1, the recommender A who desires to gain rewards for introduction recommends a product to the other users by sending a recommendation email. The other users may be colleagues in the recommender's company, those who have the same interest as the recommender, those who have become acquainted with the recommender in off-line meeting, those who are registered in the same mailing list as the recommender and the like, for example.

The other users $B_1$ to $B_{10}$ do not know one another in some cases. The other users $B_1$ to $B_{10}$ do not know that the recommendation email sent to them is also sent to the other users in some cases. Accordingly, it is sometimes difficult to prompt the other users to purchase the recommended product simply by sending the recommendation email.

On the other hand, if, when the other user $B_1$, for example, purchases a product in response to the recommendation email, a message like "I bought by recommendation!" is sent as the purchase email from the other user $B_1$ to the other users $B_2$ to $B_{10}$, the other users $B_2$ to $B_{10}$ get to know that another person has actually purchased the product. By the fact that the product has been actually purchased, it is expected that an intention to purchase the product occurs to the other users $B_2$ to $B_{10}$. By promoting purchase of a product in this manner, the recommender can attain the purpose of recommendation to some extent and receive a certain degree of satisfaction.

Figure 3:
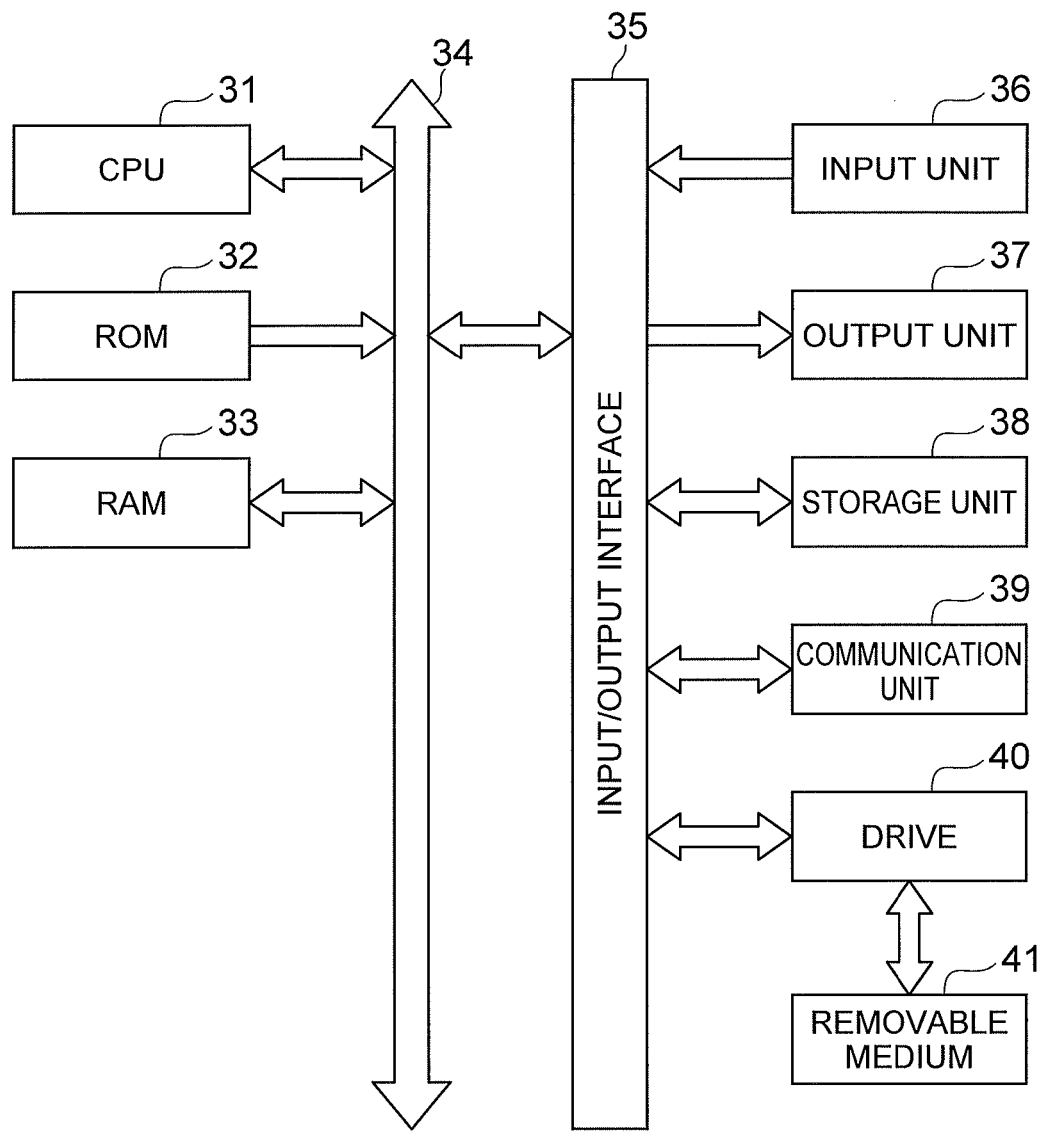
FIG. 3 is a diagram showing a hardware configuration of a server shown in FIG. 1.

FIG. 3 is a block diagram showing a hardware configuration example of the server 11. In the server 11, a CPU (Central Processing Unit) 31, ROM (Read Only Memory) 32 and RAM (Random Access Memory) 33 are connected to one another through a bus 34. An input/output interface 35 is further connected to the bus 34. To the input/output interface 35, an input unit 36 such as a keyboard, mouse or microphone, an output unit 37 such as a display or speaker, a storage unit 38 such as a hard disk or nonvolatile memory, a communication unit 39 such as a network interface, and a drive 40 that drives a removable medium 41 such as a magnetic disk, optical disk, magneto-optical disk or semiconductor memory are connected.

In the server 11, the CPU 31 loads a program stored in the storage unit 38 to the RAM 33 through the input/output interface 35 and the bus 34 and executes the program, so that processes described later are performed.

A program that is executed by the server 11 (CPU 31) is provided by being recorded in the removable medium 41 such as a magnetic disk (including flexible disk), optical disk (CD-ROM or DVD-ROM), magneto-optical disk or semiconductor memory. Alternatively, the program is provided through a wired or wireless transmission medium such as the Internet 12. The program that is executed by the server 11 (CPU 31) includes a database management program.

The database management program may be installed to a computer by, with the removable medium 41 attached to the drive 40, being stored into the storage medium 38 through the input/output interface 35. Further, the database management program may be installed to a computer by being received by the communication unit 39 and stored into the storage medium 38. Furthermore, the database management program may be pre-installed to a computer.

Figure 4:
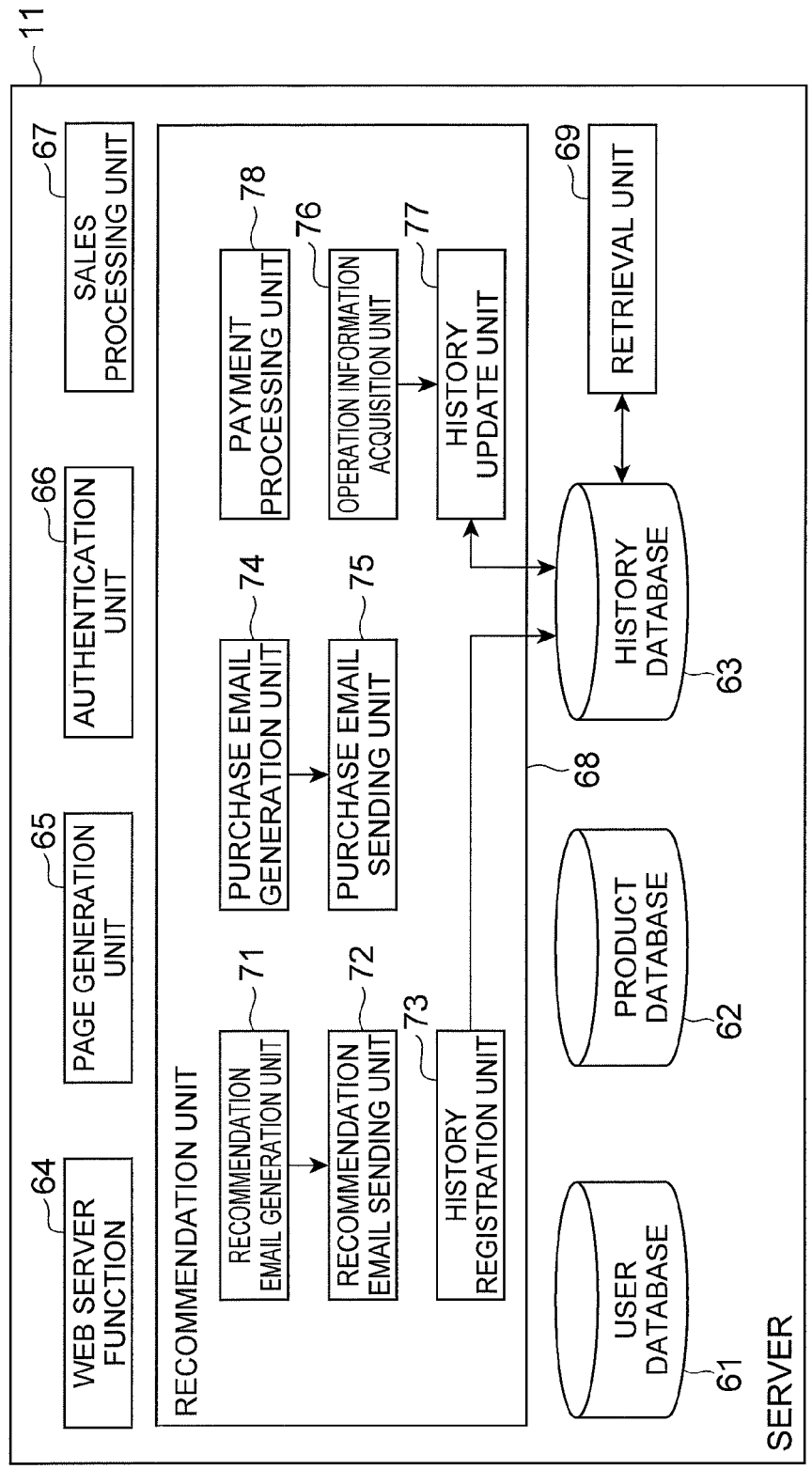
FIG. 4 is a block diagram showing a functional configuration of the server shown in FIG. 1.

FIG. 4 is a block diagram showing an example of a functional configuration of the server 11. In the server 11, by running a program such as the database management program, a user database 61, a product database 62, a history database 63, a Web server function 64, a page generation unit 65, an authentication unit 66, a sales processing unit 67, a recommendation unit 68, and a retrieval unit 69 are implemented.

The user database 61 is a means of storing user data. The user data contains a user ID, various user attributes (name, nickname, address, telephone number, email address, interest etc.), and a login password.

The product database 62 is a means of storing product data. The product data contains a product ID that identifies a product and various product attributes (product name, product image, product category, product manufacturer or supplier name, manufacturer or supplier address, sales area or supply area, URL (Uniform Resource Locator) of a Web page selling a product, product price etc.)

The history database 63 is a means of storing recommendation history (recommendation data). The data structure of the recommendation history is described later.

The databases 61 to 63 may be built directly on a file system provided by an operating system or built by a database management system.

The Web server function 64 transmits a Web page written in an arbitrary markup language (for example, HTML (Hypertext Markup Language), compact HTML, HDML (Handheld Device Markup Language), XML (Extensible Markup Language)) to the client 13 or the clients 14 on the basis of the procedure specified by HTTP. The Web page contains various kinds of objects such as text and images. Further, the Web server function 64 receives various kinds of data that are transmitted from the client 13 or the clients 14. The Web server function 64 is implemented by running a Web server program.

The page generation unit 65 is a means of generating a Web page to be transmitted to the clients 13 and 14 through the Web server function 64.

Figure 5:
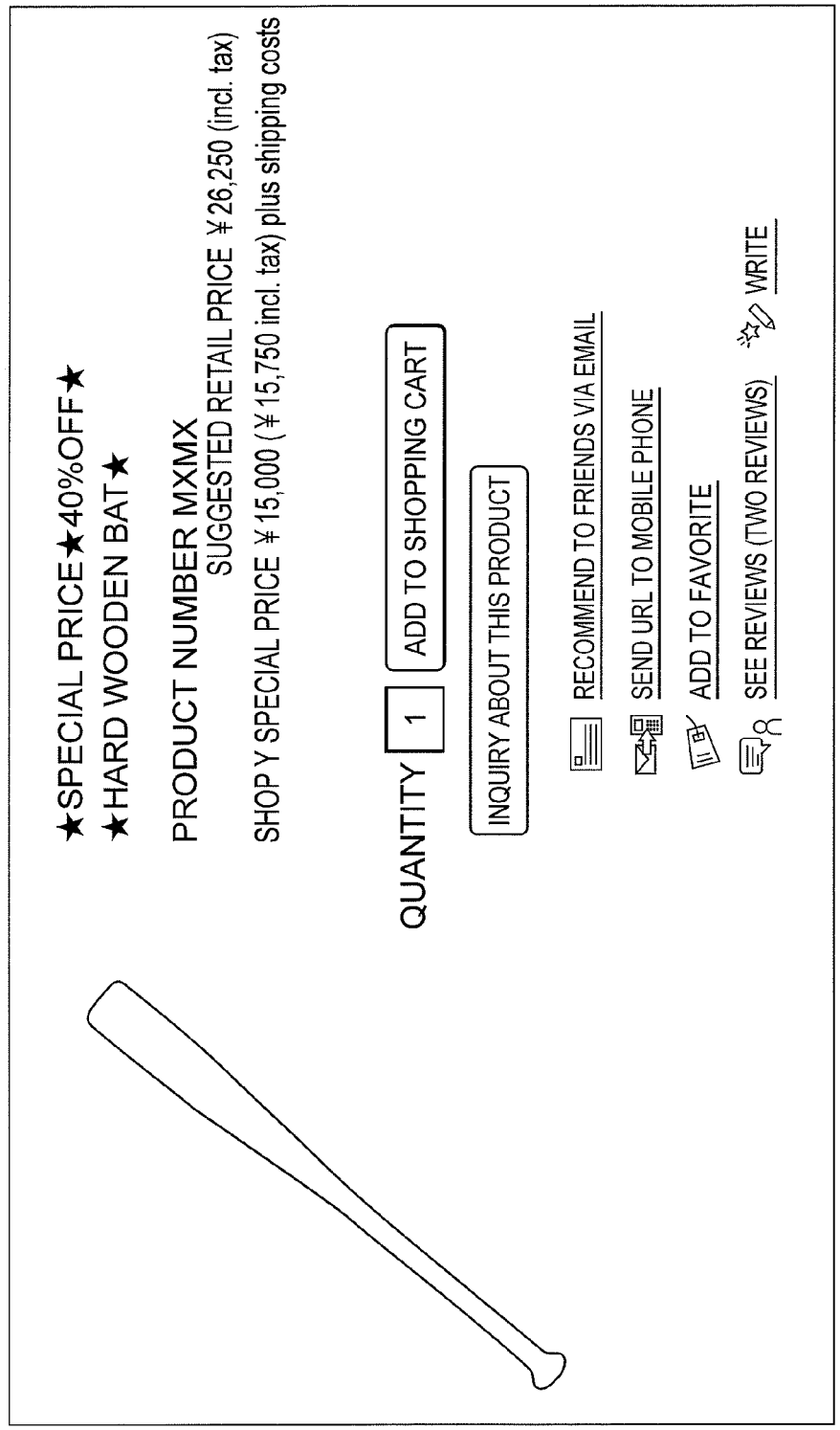
FIG. 5 is a diagram showing an example of a sales page.
Figure 11:
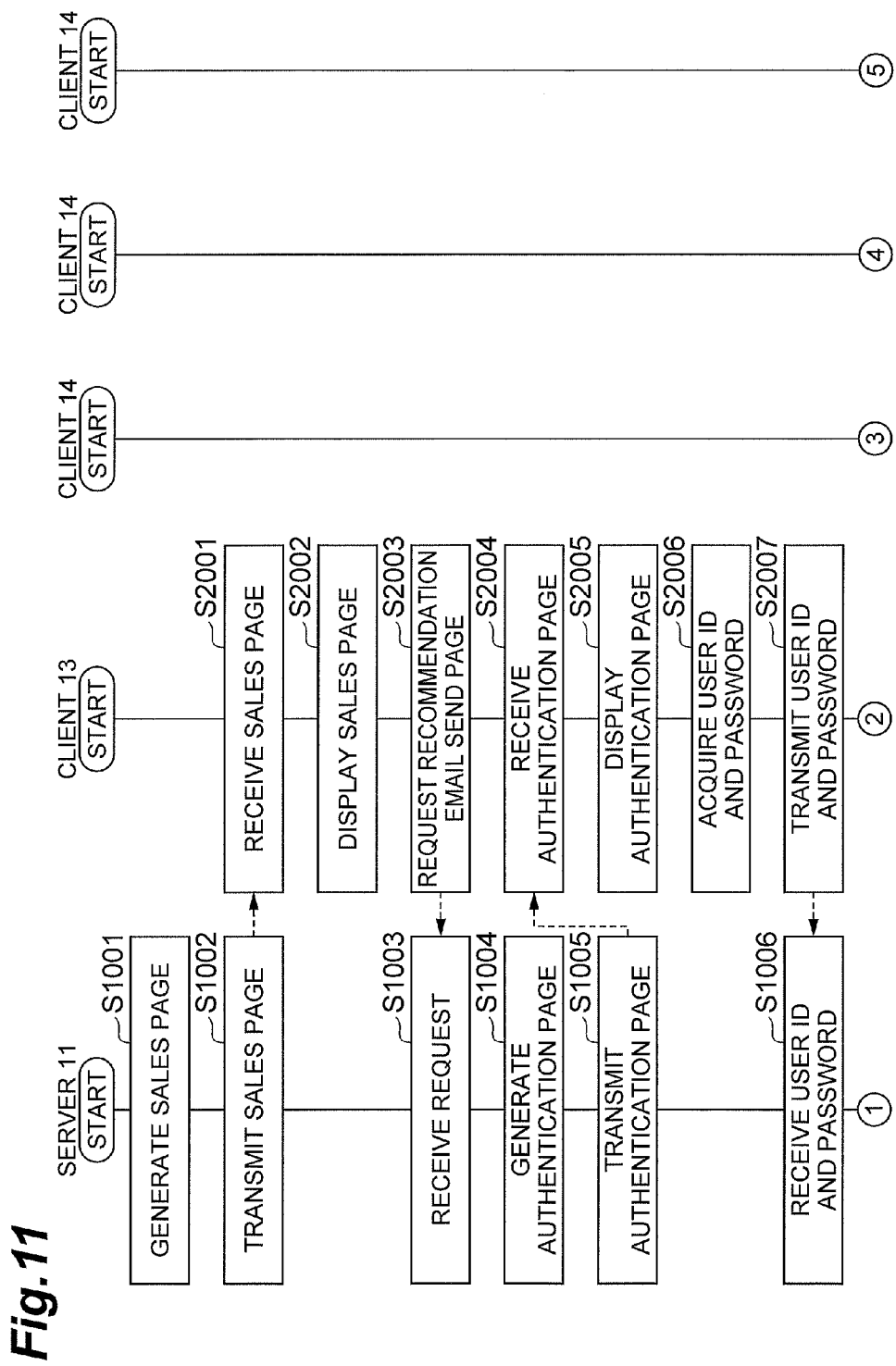
FIG. 11 is a sequence chart showing an operation of the information providing system shown in FIG. 1.
Figure 12:
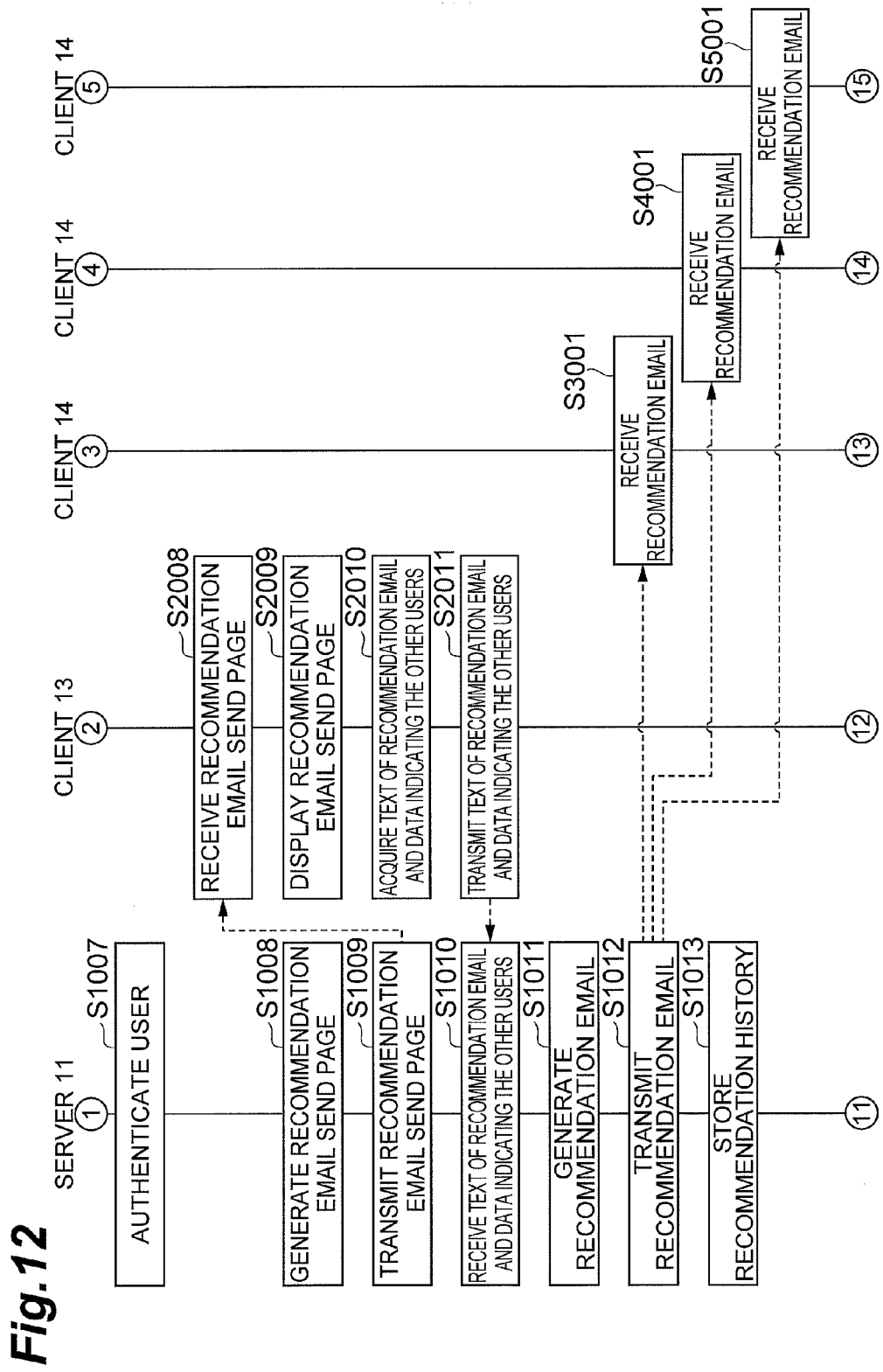
FIG. 12 is a sequence chart showing an operation of the information providing system shown in FIG. 1.
Figure 13:
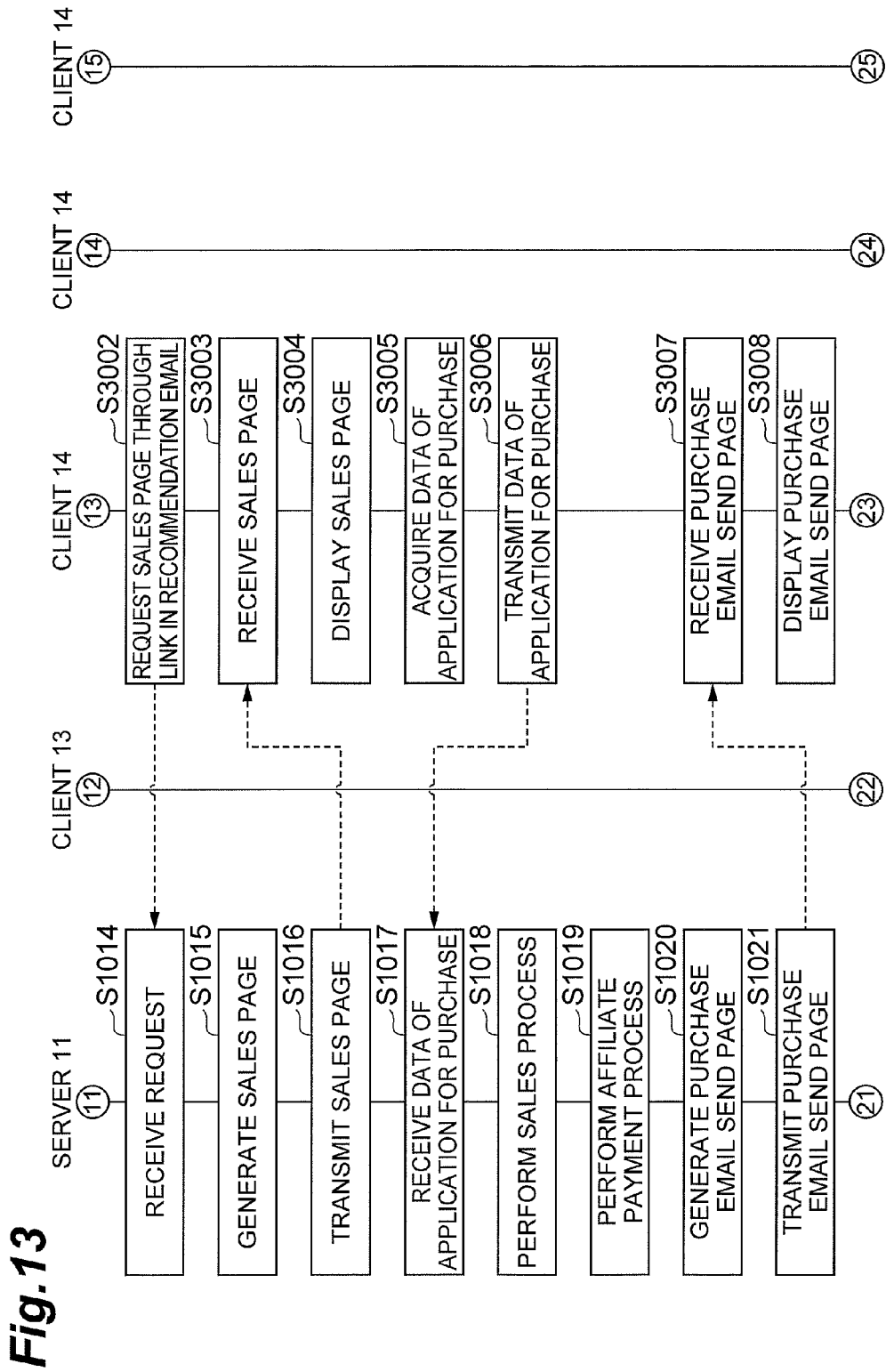
FIG. 13 is a sequence chart showing an operation of the information providing system shown in FIG. 1.
Figure 14:
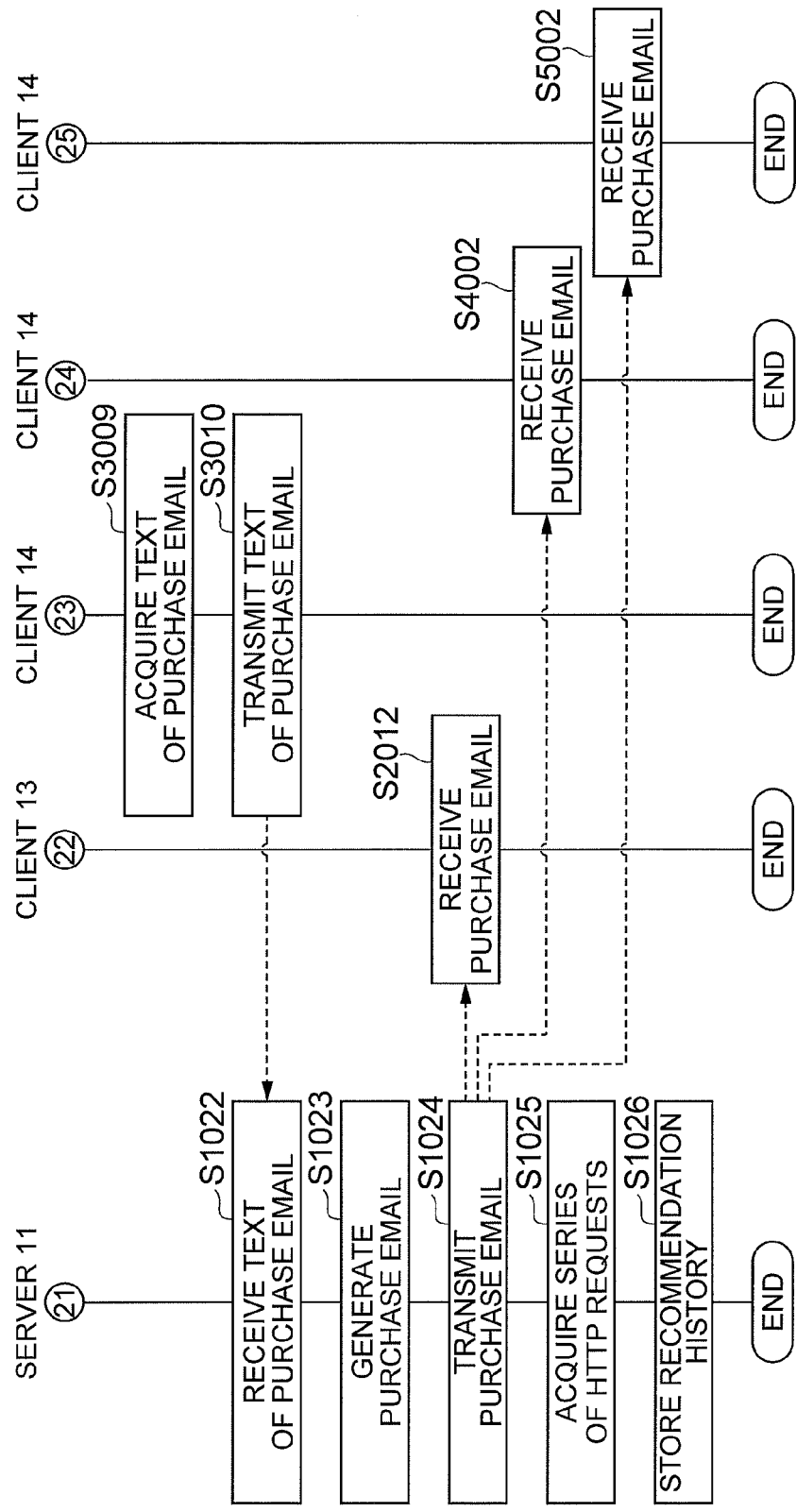
FIG. 14 is a sequence chart showing an operation of the information providing system shown in FIG. 1.

The page generation unit 65 generates a Web page (sales page) for performing a purchase procedure of a product in response to HTTP request from the client 13. The page generation unit 65 acquires product data corresponding to the HTTP request from the product database 62 and generates a sales page using the product data. As shown in FIG. 5, in the sales page, product information such as a product name ("wooden bat"), product image and product price, a "shopping cart" button for adding a product to a shopping cart, a link to send a recommendation email about this product (a link displayed as "Recommend to friends via email") and the like are placed. The generated sales page is transmitted to the client 13 by the Web server function 64 and displayed on the client 13.

When the link "Recommend to friends via email" in the sales page is clicked, the client 13 requests a Web page for sending a recommendation email, and the Web server function 64 receives the request. In response to the request, the page generation unit 65 generates an authentication page for authenticating a user of the client 13. For example, the page generation unit 65 generates an authentication page shown in FIG. 6. The "next" button in FIG. 6 is an interface for causing the server 11 to execute an authentication process. The generated authentication page is transmitted to the client 13 by the Web server function 64 and displayed on the client 13.

When a recommender is authenticated by the input user ID and password, the page generation unit 65 generates a Web page (recommendation email send page) for prompting the recommender to enter the text and destination of the recommendation email, and transmits the recommendation email send page to the client 13 through the Web server function 64. In the client 13, the recommendation email send page is displayed, and the user (recommender) enters the text and destination.

As shown in FIG. 7, the recommendation email send page contains a plurality of fields for entering one or more destinations of the recommendation email, a field for entering the text of the recommendation email, a recommended product's name and a store where it is available, and a button (send button) for sending the contents to the server 11. In the example of FIG. 10, the message "this is a good item!" is entered as the text of the recommendation email, and the email addresses of three users K, J and M are selected as the destination. Note that, in the address field, only email addresses may be entered with no nicknames entered.

When one of the other users purchases a product (recommended product) indicated in the recommendation email and becomes a purchaser, the page generation unit 65 generates a Web page (purchase email send page) for prompting the purchaser to enter the text of a purchase email. When one of the other users clicks a link to the sales page of the recommended product indicated in the recommendation email and accesses the sales page, and then purchases the product on the sales page, the client 14 transmits data for an application of purchase (application data) to the server 11. The application data contains a tracking identifier indicating that access is made to the sales page through the link of the recommendation email. The tracking identifier is described later. The page generation unit 65 generates the purchase email send page in response to the application data and sends the purchase email send page to the client 14 of the purchaser through the Web server function 64. The purchase email send page contains product information of the recommended product and the tracking identifier. Note that the text of the purchase email may be sent to the server 11 as a part of the application data.

On the purchase email send page, a button to select whether or not to send the purchase email may be placed. In this case, when a purchaser selects sending of the purchase email, data such as the text of the purchase email is sent to the server 11 and, when a purchaser cancels sending of the purchase email, data indicating the cancellation is sent to the server 11. By giving a purchaser an option regarding sending of the purchase email, the purchaser can keep others unaware of the fact of purchase. In this way, the privacy of the purchaser can be respected.

The authentication unit 66 is a means of authenticating users of the clients 13 and 14. When a user of any of the clients 13 and 14 enters a user ID and password on the authentication page and clicks the "next" button, the client 13 or 14 transmits the user ID and password to the server 11, and the Web server function 64 receives those data. The authentication unit 66 authenticates the user by verifying the user ID and password combination.

The sales processing unit 67 is a means of performing a sales process such as arrangements for a product and billing when an application for purchase of a product is made from the client 14.

The recommendation unit 68 is a means of acquiring the text of a recommendation email that recommends a product from the client 13 and sending a recommendation email that contains the acquired text and product information corresponding to a product to be recommended (recommended product) to the other users. Further, the recommendation unit 68 is a means of, when one of the other users purchases a recommended product, sending a purchase email that contains a message indicating purchase of the recommended product from that user (purchaser) to the other users other than the purchaser. The process executed in the recommendation unit 68 is based on the precondition that a user of the client 13 is authenticated by the authentication unit 66.

The recommendation unit 68 includes a recommendation email generation unit 71, a recommendation email sending unit 72, a history registration unit (email acquisition unit) 73, a purchase email generation unit 74, a purchase email sending unit 75, an operation information acquisition unit 76, a history update unit 77, and a payment processing unit 78.

The recommendation email generation unit 71 is a means of generating a recommendation email based on an instruction from a recommender. When a recommender enters necessary data in the recommendation email send page and presses the send button, the client 13 transmits data indicated in the page to the server 11. The Web server function 64 receives the data and outputs the data to the recommendation email generation unit 71 and the history registration unit 73.

The recommendation email generation unit 71 acquires the text and destination of the recommendation email from the input data. The recommendation email generation unit 71 then generates a recommendation email in which a predetermined title, a recommender ID, the acquired text of the recommendation email, the product information displayed on the recommendation email send page (product name, manufacturer or supplier name, sales page URL, price etc.) are shown and which is addressed to the acquired email addresses. In the recommendation email, the URL of a sales page of the recommended product is placed as a link. The recommendation email generation unit 71 outputs the generated recommendation email to the recommendation email sending unit 72 and the history registration unit 73.

In this embodiment, a redirect URL according to the domain of the destination of the recommendation email, not the URL of an actual sales page, is notified as the URL of a sales page to the other users. In the URL (redirect URL) of a sales page shown on the recommendation email, a tracking identifier for specifying which of the users who have received the recommendation email has actually made operation on the sales page is embedded. Because the tracking identifier is used to differentiate the combination of a recommendation email and a destination address, in the case of sending one recommendation email to a plurality of destinations, tracking identifiers different for the respective destinations are generated. A value to be set as the tracking identifier is not particularly limited. For example, a value obtained by encrypting a destination email address or a given value corresponding to the email address may be used as the tracking identifier. The tracking identifier is implemented as an HTTP Cookie.

The text of the recommendation email is an example of recommendation information. The recommendation information may be in any form as long as it is information for recommending a product, and thus the recommendation information may be indicated in a form different from the text of an email. For example, the level (1, 2, 3 and the like) or the ranking of evaluation of the recommended product specified by a recommender may be used as the recommendation information.

The recommendation email sending unit 72 is a means of sending the recommendation email that is input from the recommendation email generation unit 71 to each of the other users designated.

The history registration unit 73 is a means of generating recommendation history (recommendation data) in which a recommender, the other user and a web page of a product are associated and registering the recommendation history into the history database 63.

The history registration unit 73 acquires a recommender ID, the email addresses of the other users and the URL of the sales page of the recommended product from the information input from the recommendation email generation unit 71. Then, the history registration unit 73 generates a record (initial data) of the recommendation history by using those acquired data. The record of the recommendation history contains a recommender ID, a group ID generated to identify a recommendation email, the date and time the recommendation email has been sent, a send ID assigned to each set of one recommendation email and one destination (which differs from record to record), the email address of a destination, the URL of a sales page shown on the recommendation email, and action information indicating the actions of the other users.

FIG. 8 shows an example of the initial data stored in the history database 63. FIG. 8 shows the recommendation history regarding two recommendation emails sent from a recommender with the ID of "001". The recommendation email with the group ID of "001" has been sent to three persons, and the recommendation email with the group ID of "001" has been sent to two persons.

As described above, because a redirect URL according to a destination domain is notified as the URL of a sales page to the other user, the URL differs depending on destination (destination domain) even with the same group ID as shown in FIG. 8. For example, the three redirect URLs "http://abc.aaa.ne.jp", "http://abc.bbb.ne.jp" and "http://abc.ccc.ne.jp" are linked to the URL of an actual sales page "http://bbb.co.jp/ccc". The tracking identifier also differs from record to record, just like the send ID.

The action information contains access information indicating when the other user has accessed a sales page, login information indicating when the other user has logged into a sales page, purchase information indicating when the other user has purchased a recommended product, purchase email information indicating when the other user has sent a purchase email, favorite information indicating when the other user has added a sales page to favorites, and response email information indicating in response to which email those actions have been taken. At the point of time when the recommendation email is sent from the server 11 to each destination, the other user has not even accessed the sales page, and therefore initial values of the access information, login information, purchase information, purchase email information and favorite information are all set as "NO (no action)", and "null" is set to the response email information.

Although the record of the recommendation history is sorted out based on the recommender ID in the example of FIG. 8, the record of the recommendation history may be sorted out based on the email address of the other user as shown in FIG. 9. In any case, the recommendation history is data indicating the association of a recommender, the other user, a product web page, and the other user's action.

After generating the initial data of the recommendation history, the history registration unit 73 stores the initial data into the history database 63. The recommendation history corresponding to the recommendation email sent from the recommendation email sending unit 72 is thereby registered in the history database 63. The action information of the registered recommendation history is updated by the history update unit 77, which is described later.

The purchase email generation unit 74 is a means of generating a purchase email indicating that the other user has purchased the recommended product indicated in the recommendation email. When one of the other users (purchaser) who has purchased the product enters necessary data in the purchase email send page and presses the send button, the client 14 transmits data indicated in the page to the server 11. The input data contains the text of the purchase email (for example, "this is a really good item!") and the tracking identifier embedded in the URL of the sales page shown on the recommendation email. The Web server function 64 receives the data and outputs the data to the purchase email generation unit 74. Note that, in the case where the other user can select whether or not to send the purchase email and data indicating the cancellation of sending is transmitted, the purchase email generation unit 74 does not perform the purchase email generation process described below.

The purchase email generation unit 74 acquires the text of the purchase email from the input data. Further, the purchase email generation unit 74 reads the recommendation history corresponding to the acquired tracking identifier from the history database 63 and thereby specifies the email addresses of the other users who have received the same recommendation email as the one sent to the purchaser. Further, the purchase email generation unit 74 acquires the email address of the recommender who is the sender of the recommendation email from the user database 61. Then, the purchase email generation unit 74 generates a purchase email in which a predetermined title, the acquired text of the purchase email, the product information displayed on the purchase email send page (product name, manufacturer or supplier name, URL of a sales page, price etc.) are shown and which is addressed to the read email addresses. On the purchase email also, a redirect URL is set as the URL of a sales page of a recommended product, and the URL is placed as a link. The destination addresses of the purchase email do not include the email address of the purchaser. The purchase email generation unit 74 outputs the generated purchase email to the purchase email sending unit 75.

In the URL (redirect URL) of a sales page shown on the purchase email, not only the tracking identifier but also an additional identifier for specifying which of the users who have received the purchase email has actually made operation on the sales page is embedded. Because the additional identifier is used to differentiate the combination of a purchase email and a destination address, in the case of sending one purchase email to a plurality of destinations, additional identifiers different for the respective destinations are generated. Although the additional identifier may be set based on an email address just like the tracking identifier, the additional identifier needs to not overlap the tracking identifier. The additional identifier is also implemented as an HTTP Cookie.

The text of the purchase email is an example of purchase information. The purchase information may be in any form as long as it is information indicating that a product is purchased, and thus the purchase information may be indicated in a form different from the text of an email. For example, a purchase price, the evaluation of a product, a product image and the like may be used as the purchase information.

The purchase email may contain information identifying a purchaser (for example, a nickname), date and time purchased or the like.

The purchase email sending unit 75 is a means of sending the purchase email that is input from the purchase email generation unit 74 to the recommender and the other users.

The operation information acquisition unit 76 is a means of acquiring operation information indicating operation performed on the sales page by the other user in response to the recommendation email. The operation information acquisition unit 76 acquires the operation information by analyzing a series of HTTP requests received by the Web server function 64 and the processing results in the authentication unit 66, the sales processing unit 67 or the purchase email generation unit 74.

The operation information acquisition unit 76 determines whether the HTTP request that requests a sales page at least contains the tracking identifier or not. When the HTTP request does not contain the tracking identifier, the request is not made in response to sending of a recommendation page, and therefore the operation information acquisition unit 76 ends the process without acquiring the operation information.

On the other hand, when the HTTP request contains the tracking identifier, the operation information acquisition unit 76 determines whether the HTTP request further contains the additional identifier or not. When the HTTP request contains only the tracking identifier, the operation information acquisition unit 76 determines that operation in response to the recommendation email is being performed and, when the HTTP request contains both the tracking identifier and the additional identifier, the operation information acquisition unit 76 determines that operation in response to the purchase email is being performed. After specifying the email that causes the operation to be performed, the operation information acquisition unit 76 acquires a series of HTTP requests made after that as the operation information. The series of HTTP requests is a set of one or more HTTP requests that are made in one session. The operation information acquisition unit outputs the series of HTTP requests and email type information indicating the specified email type (the recommendation email or the purchase email) to the history update unit 77.

The history update unit 77 is a means of specifying the other user's action on a recommended object based on the operation information (a series of HTTP requests) input from the operation information acquisition unit 76 and adding action information indicating the specified action to the corresponding recommendation history. In other words, the history update unit 77 is a means of updating the action information of the recommendation history in the history database 63. Because web pages change in a given order by a user's operation, the user's action can be specified by analyzing the order of a series of HTTP requests and the contents of each HTTP request.

When it is specified based on the operation information that the other user has accessed the sales page of the recommended product, the history update unit 77 updates the access information of the record corresponding to the tracking identifier to information composed of information "YES" indicating access and date and time accessed. For example, the history update unit 77 stores the corresponding access information as information "YES (2010.5.10 22:40:00)". Further, the history update unit 77 updates the response email information of the record corresponding to the tracking identifier to the input email type information.

When it is specified based on the operation information that the other user has logged into the sales page of the recommended product, the history update unit 77 updates the login information of the record corresponding to the tracking identifier to information composed of information "YES" indicating login and date and time logged in. Further, the history update unit 77 updates the response email information of the record corresponding to the tracking identifier to the input email type information.

When it is specified based on the operation information that the other user has purchased the recommended product, the history update unit 77 updates the purchase information of the record corresponding to the tracking identifier to information composed of information "YES" indicating purchase and date and time purchased. Further, the history update unit 77 updates the response email information of the record corresponding to the tracking identifier to the input email type information.

When it is specified based on the operation information that the other user has sent the purchase email, the history update unit 77 updates the purchase email information of the record corresponding to the tracking identifier to information composed of information "YES" indicating sending of a purchase email and date and time sent. Further, the history update unit 77 updates the response email information of the record corresponding to the tracking identifier to the input email type information.

When it is specified based on the operation information that the other user has added the sales page of the recommended product to favorites, the history update unit 77 updates the favorite information of the record corresponding to the tracking identifier to information composed of information "YES" indicating addition to favorites and date and time added. Further, the history update unit 77 updates the response email information of the record corresponding to the tracking identifier to the input email type information.

FIG. 10 shows an example of the recommendation history updated by the history update unit 77. The example shown in FIG. 10 corresponds to the data structure shown in FIG. 8. This example tells that, in response to the recommendation email with the group ID of "G001", a user (user J) with the email address "user_j@aaa.ne.jp" has accessed and logged into the sales page, purchased the recommended product and further sent the purchase email. It also tells that a user (user K) with the email address "user_k@aaa.ne.jp" has accessed the sales page and purchased the recommended product in response to the purchase email from the user J (indirectly, in response to the recommendation email with the group ID of "G001"). Because the user K has purchased the product without logging in, the user K has probably not become a member of an online shopping site offered by the server 11. The example of FIG. 10 also tells that, in response to the recommendation email with the group ID of "G002", a user (user X) with the email address "user_x@ccc.ne.jp" has added the sales page to favorites. It also tells that a user (user M) with the email address "user_m@ccc.ne.jp" has not responded to the recommendation email with the group ID of "G001" and that the user J has not responded to the recommendation email with the group ID of "G002".

The payment processing unit 78 is a means of performing a process of paying rewards to a recommender when the other user purchases a product through a Web page indicated by product information in the recommendation email. In other words, the payment processing unit 78 performs a process regarding affiliate payouts. The payment for the affiliate is not limited to be made by cash, and the payment may be made by points that can be exchanged for a product or the like.

The retrieval unit 69 is a means of retrieving the recommendation history in the history database 63 by an arbitrary way. The retrieval unit 69 performs retrieval of the recommendation history with specified conditions or various statistical processing in response to operation by an administrator of the server 11 or a request signal from another server (not shown).

For example, the retrieval unit 69 calculates the total or average number of purchases, accesses or the like made in response to the recommendation email and calculates the speed of response (purchase, access or the like) to the recommendation email. Such retrieval is an example of using the recommendation history for measurement of the effects of the recommendation email. Further, the retrieval unit 69 may extract candidates for a destination of the next recommendation email by retrieving users who are likely to take some action in response to the recommendation email among the other users associated with a specific recommender. Furthermore, the retrieval unit 69 may retrieve the recommendation history of a specific user, retrieve a product which the user has purchased or accessed in the past, and then extract another product belonging to the same category as the retrieved product from the product database 62. It is thereby possible to present a recommended product to the other user.

The above-described purpose and method of the retrieval are just examples, and the retrieval unit 69 may retrieve the recommendation history in various ways.

A process of recommending a product from a user of the client 13 to users of the clients 14, and a database management method according to the embodiment are described hereinafter with reference to FIGS. 11 to 14.

First, in the server 11, the page generation unit 65 generates a sales page in response to HTTP request from the client 13, and the Web server function transmits the sales page to the client 13 (Step S1001, S1002).

The client 13 receives and displays the sales page (Step S2001, S2002). In this sales page, when a link to a recommendation email send page is clicked, the client 13 requests the send page to the server 11 (Step S2003).

In the server 11, the Web server function receives the HTTP request, and the page generation unit 65 generates an authentication page in response to the HTTP request (Step S1003, S1004). Then, the Web server function 64 transmits the authentication page to the client 13 (Step S1005).

The client 13 receives and displays the authentication page (Step S2004, S2005). In this authentication page, when a user ID and password are entered and a button for authentication is clicked, the client 13 acquires the user ID and password and transmits them to the server 11 (Step S2006, S2007).

In the server 11, the Web server function 64 receives the user ID and password (Step S1006). Then, the authentication unit 66 authenticates the user of the client 13 by verifying those user ID and password against the user ID and password stored in the user database 61 (Step S1007).

When the user of the client 13 is authenticated, the page generation unit 65 generates a recommendation email send page (Step S1008), and the Web server function 64 transmits the recommendation email send page to the client 13 (Step S1009).

The client 13 receives and displays the recommendation email send page (Step S2008, S2009). When, in this page, the other users are selected, the text of a recommendation email is entered, and the send button is clicked, the client 13 acquires the text and data indicating the other users and transmits those data to the server 11 (Step S2010, S2011).

In the server 11, the Web server function 64 receives the text of a recommendation email and the data indicating the other users (Step 1010). Then, the recommendation email generation unit 71 generates a recommendation email using those data (Step S1011), and the recommendation email sending unit 72 sends the recommendation email to the other users selected by the recommender (Step S1012). The recommendation email is received by each of the clients 14 (Step S3001, S4001, S5001). In the server 11, the history update unit 77 generates the recommendation history based on the information of the recommendation email and stores it into the history database 63 (Step S1013, email acquisition step and registration step).

When a user of the client 14, which is one of the other users, clicks a link to the sales page of the product (recommended product) indicated in the recommendation email, the client 14 requests the sales page (Step S3002).

In the server 11, the Web server function 64 receives the HTTP request (Step S1014). Then, the page generation unit 65 generates the sales page of the recommended product in response to the HTTP request (Step S1015), and the Web server function 64 sends the sales page to the client 14 (Step S1016).

The client 14 receives and displays the sales page (Step S3003, S3004). When the user of the client 14 executes a series of operations to purchase the product (for example, operation of adding a product to a shopping cart, operation of entering a user ID and password, operation of designating a payment method and the like) on the sales page, the client 14 acquires data of application for purchase (application data) and transmits the data to the server 11 (Step S3005, S3006).

In the server 11, the Web server function 64 receives the application data (Step S1017). Then, the sales processing unit 67 executes a sales process (Step S1018), and the payment processing unit 78 performs an affiliate payment process for the recommender (S1019). After that, the page generation unit 65 generates a purchase email send page (Step S1020), and the Web server function 64 transmits the purchase email send page to the client 14 of the purchaser (Step S1021).

The client 14 of the purchaser receives and displays the purchase email send page (Step S3007, S3008). When the purchaser enters the text of a purchase email in the purchase email send page, the client 14 acquires the text and transmits it to the server 11 (S3009, S3010).

In the server 11, the Web server function 64 receives the text of a purchase email (Step S1022). Then, the purchase email generation unit 74 generates a purchase email containing the text (Step S1023), and the purchase email sending unit 75 sends the purchase email to the recommender and the other users other than the purchaser (Step S1024). The purchase email is received by the client 13 and the clients 14 of the users other than the purchaser (Step S2012, S4002, S5002). After that, the operation information acquisition unit 76 acquires a series of HTTP requests in Steps S3002 to S3010 as operation information (Step S1025, operation information acquisition step), and the history update unit 77 updates the records about the purchaser in the recommendation history based on the operation information (Step S1025, update step). The recommendation process by the recommendation email and the purchase email, and the recording of the recommendation history corresponding to the recommendation process thereby end.

When a user of another client 14 purchases the recommended product, the above process is performed in the same way, and the purchase email is sent to the recommender and the other users (other than the purchaser of the recommended product), and the corresponding recommendation history is updated.

The above-described process may be executed by hardware or software. In the case of executing the process by software, a program constituting the software is installed to a computer from a program recording medium.

It should be noted that the program executed by a computer may be a program that is processed in a time sequence according to the order shown in this embodiment or a program that is processed in parallel or at a necessary timing such as when called.

As described above, according to this embodiment, a recommendation history is generated based on a recommendation email sent from a recommender to the other users and stored into the history database 63. After that, when the other user operates the web page of the product in response to the recommendation email, action information indicating the action specified based on the operation is added to the recommendation history. Specifically, the recommender, the other users who have received recommendation, the recommended product, and the other user's action on the recommended product are associated. What actions the other users have taken after receiving the recommendation email are thereby obtained as the recommendation history. The data that contributes to the measurement of effects can be thereby collected.

Various kinds of effect measurement regarding recommendation can be performed by carrying out arbitrary computations using the recommendation history. For example, by compiling the access information, login information, purchase information and favorite information of the recommendation history, it is possible to evaluate how much attention the product has captured because of the recommendation email. Further, by compiling the purchase information of the recommendation history, it is possible to evaluate how much the number of purchases of the product has increased because of the recommendation email. Furthermore, the degree of attraction to the product or the degree of contribution to the number of purchases of the product can be evaluated in the same manner for the purchase email.

By compiling the purchase information of the recommendation history, it is possible to estimate the preferences of a product of a user and further present another recommended product to a user. Further, it is possible to present users who are likely to respond to the recommendation email to a user who intends to make recommendations of a product. In this manner, by generating and accumulating the recommendation history, various kinds of data analysis and recommendation can be made. Further, various kinds of data analysis can be made by associating the recommendation history with other data such as user data or product data and carrying out arbitrary computations.

By recording the date and time the recommendation email has sent and the date and time the user's action has taken as in this embodiment, it is possible to use the recommendation data for the measurement of various effects related to time. For example, because the speed of response of each user to the recommendation email can be obtained by a difference between the date and time sent and the date and time acted, it is possible to present the user who has made a quick response to a recommender, for example.

In this embodiment, because the destination of the recommendation email can be used as it is as the identifier of the other user, the recommendation history can be generated for any users. For example, the recommendation history can be generated for a user who is not a member of an online shopping site. This allows the collection of data to be used for effect measurement over a wide range. Further, because an email address can be used as it is, the identifier of the other user can be easily obtained. Note that, however, the other user may be identified using data other than an email address. For example, the other user may be identified by another user ID, which is a value generated by an arbitrary way.

The embodiment of the present invention is described in detail above. However, the present invention is not restricted to the above-described embodiment, and various changes and modifications may be made without departing from the scope of the invention.

Although the server 11 includes the payment processing unit 78 and the retrieval unit 69 in the above embodiment, those mechanical components may be omitted. In other words, a process for the payment of affiliates or the use of retrieval history (measurement of recommendation effects etc.) can be skipped.

The databases 61 to 63 may be placed on a computer different from the server 11. In this case, the server 11 may access those databases through a network.

Although a product is recommended using the recommendation email by the server 11, a target of recommendation is not limited to a product. For example, a target of recommendation may include invitation to membership or membership card, entry into campaign and the like. Thus, the type of applications is also not limited to an application for purchase, and there may be various different applications such as application for membership and application for entry.

The structure of the recommendation history is not limited to those shown in FIGS. 8 to 10, and various modifications may be made. For example, registration of date and time sent or date and time in the action information may be eliminated. Further, the type of the other user's action indicated by the action information may be determined arbitrarily. For example, the action information may indicate only purchase (only purchase information) of a recommended product or indicate an action other than those described in the above embodiment. Further, the type of email that has directly caused the other user's action may not necessarily specified, and only the actions which the other users have taken in response to the recommendation email may be recorded as the action information.

Although the URL redirect is used in the above embodiment, the redirect processing is not necessarily used. In this case, however, it is necessary to embed the tracking identifier or the additional identifier into the URL of the sales page shown in the recommendation email or the purchase email.

| Reference Signs List | |
|---|---|
| 1 | Information providing system, |
| 11 | Server (database management device), |
| 12 | Internet, |
| 13, 14 | Client, |
| 15 | Redirect server, |
| 61 | User database, |
| 62 | Product database, |
| 63 | History database |
| 64 | Web server function, |
| 65 | Page generation unit, |
| 66 | Authentication unit, |
| 67 | Sales processing unit, |
| 68 | Recommendation unit, |
| 69 | Retrieval unit, |
| 71 | Recommendation email generation unit, |
| 72 | Recommendation email sending unit, |
| 73 | History registration unit (email acquisition unit), |
| 74 | Purchase email generation unit, |
| 75 | Purchase email sending unit, |
| 76 | Operation information acquisition unit, |
| 77 | History update unit, |
| 78 | Payment processing unit |

The invention claimed is:

1. A database management device comprising:
an email acquisition unit that acquires information of a recommendation email for recommending a specified recommended object from a first user to a plurality of second users, the recommendation email containing information about a web page of the recommended object and a tracking identifier;
a registration unit that generates recommendation data in which the first user, the plurality of second users and the web page of the recommended object are associated based on the information acquired by the email acquisition unit, and registers the recommendation data into a database;
an operation information acquisition unit that determines whether a signal includes the tracking identifier, the signal indicating a request for the web page of the recommended object by at least one user of the plurality second users, and that, when the signal includes the tracking identifier, acquires operation information indicating operation performed by the at least one user of the plurality second users on the web page of the recommended object in response to the recommendation email, and when the signal does not include the tracking identifier, does not acquire the operation information; and
an update unit that specifies an action of the at least one user of the plurality of second users taken on the recommended object based on the operation information and adds action information indicating the specified action to the corresponding recommendation data, wherein
the action of the at least one user of the plurality of second users specified by the update unit includes sending of an application email to other users of the plurality of second users, the application email letting the other users of the plurality of second users know that application is made for the recommended object by the at least one user of the plurality of second users.

2. The database management device according to claim 1, wherein
in the recommendation data, the plurality of second users are identified by their respective email-addresses.

3. The database management device according to claim 1, wherein
the recommendation data further contains date and time the recommendation email has been sent, and
the action information further indicates date and time the at least one user of the plurality of second users has taken the action.

4. The database management device according to claim 1, wherein
the action of the at least one user of the plurality of second users specified by the update unit includes at least one of access to the web page of the recommended object, login to the web page of the recommended object, application for the recommended object, and addition of the web page of the recommended object to favorites.

5. The database management device according to claim 1, wherein
a web page for selecting whether to send the application email is provided to a terminal of the at least one user of the plurality of second users having applied for the recommended object, and the application email is sent to the other users of the plurality of second users only when the at least one user of the plurality of second users has selected to send the application email.

6. The database management device according to claim 1, wherein
the recommendation data updated by the update unit is used for at least one of measurement of effects of the recommendation email, presentation of destinations of the recommendation email to the first user, and presentation of a recommended product to the plurality of second users.

7. The database management device according to claim 1, wherein
the application email contains both of an additional identifier for identifying a combination of the application email and a destination of the application email and the tracking identifier,
the operation information acquisition unit acquires the operation information when at least the tracking identifier is received from a terminal of the at least one user of the plurality of second users having accessed the web page of the recommended object, and
the update unit adds the action information indicating that the at least one user of the plurality of second users has taken the action in response to the recommendation email when it is determined that the tracking identifier is received but the additional identifier is not received, and adds the action information indicating that the at least one user of the plurality of second users has taken the action in response to the application email when it is determined that both of the additional identifier and the tracking identifier are received.

8. The database management device according to claim 1, further comprising:
a retrieval unit that, by retrieving the recommendation data to which the action information has been added by the update unit, performs at least one of a process of extracting candidates for a destination of the next recommendation email to be sent by the first user and a process of extracting another product belonging to the same category as a product for which the at least one user of the plurality of second users has applied in the past from a product database and presenting said another product as a recommended product to the at least one user of the plurality of second users.

9. A database management method executed by a database management device, the method comprising:
- an email acquisition step of acquiring information of a recommendation email for recommending a specified recommended object from a first user to a plurality of second users, the recommendation email containing information about a web page of the recommended object and a tracking identifier;
- a registration step of generating recommendation data in which the first user, the plurality of second users and the web page of the recommended object are associated based on the information acquired in the email acquisition step, and registering the recommendation data into a database;
- an operation information acquisition step of determining whether a signal includes the tracking identifier, the signal indicating a request for the web page of the recommended object by at least one user of the plurality second users, and that, when the signal includes the tracking identifier, acquiring operation information indicating operation performed by at least one user of the plurality of second users on the web page of the recommended object in response to the recommendation email, and when the signal does not include the tracking identifier, not acquiring the operation information; and
- an update step of specifying an action of the at least one user of the plurality of second users taken on the recommended object based on the operation information and adding action information indicating the specified action to the corresponding recommendation data, wherein
the action of the at least one user of the plurality of second users specified in the update step includes sending of an application email to other users of the plurality of second users, the application email letting the other users of the plurality of second users know that application is made for the recommended object by the at least one user of the plurality of second users.

10. A non-transitory computer-readable recording medium that stores a database management program causing a computer to implement:
- an email acquisition unit that acquires information of a recommendation email for recommending a specified recommended object from a first user to a plurality of second users, the recommendation email containing information about a web page of the recommended object and a tracking identifier;
- a registration unit that generates recommendation data in which the first user, the plurality of second users and the web page of the recommended object are associated based on the information acquired by the email acquisition unit, and registers the recommendation data into a database;
- an operation information acquisition unit that determines whether a signal includes the tracking identifier, the signal indicating a request for the web page of the recommended object by at least one user of the plurality second users, and that, when the signal includes the tracking identifier, acquires operation information indicating operation performed by at least one user of the plurality of second users on the web page of the recommended object in response to the recommendation email, and when the signal does not include the tracking identifier, does not acquire the operation information; and
- an update unit that specifies an action of the at least one user of the plurality of second users taken on the recommended object based on the operation information and adds action information indicating the specified action to the corresponding recommendation data, wherein
the action of the at least one user of the plurality of second users specified by the update unit includes sending of an application email to other users of the plurality of second users, the application email letting the other users of the plurality of second users know that application is made for the recommended object by the at least one user of the plurality of second users.

* * * * *